United States Patent

Hukkanen

(10) Patent No.: US 8,944,660 B2
(45) Date of Patent: Feb. 3, 2015

(54) LIGHT GUIDE

(71) Applicant: Ledil Oy, Salo (FI)

(72) Inventor: Hannu Hukkanen, Salo (FI)

(73) Assignee: Ledil Oy, Salo (FI)

( * ) Notice: Subject to any disclaimer, the term of this patent is extended or adjusted under 35 U.S.C. 154(b) by 51 days.

(21) Appl. No.: 13/788,215

(22) Filed: Mar. 7, 2013

(65) Prior Publication Data

US 2014/0204587 A1 Jul. 24, 2014

(30) Foreign Application Priority Data

Jan. 23, 2013 (FI) ...................................... 20135063

(51) Int. Cl.
*F21V 7/04* (2006.01)
*F21V 7/00* (2006.01)
*F21V 13/04* (2006.01)
*F21V 5/04* (2006.01)
*G02B 3/08* (2006.01)
*G02B 19/00* (2006.01)

(52) U.S. Cl.
CPC .............. *F21V 7/0091* (2013.01); *F21V 13/04* (2013.01); *F21V 5/045* (2013.01); *G02B 3/08* (2013.01); *G02B 19/0028* (2013.01); *G02B 19/0061* (2013.01)
USPC ............................ 362/607; 362/608; 362/609

(58) Field of Classification Search
USPC ............. 362/311.02; 359/726, 709, 627, 642, 359/728
See application file for complete search history.

(56) References Cited

U.S. PATENT DOCUMENTS

| 4,698,730 | A | | 10/1987 | Sakai et al. | |
| 5,040,098 | A | * | 8/1991 | Tanaka et al. | 362/634 |
| 8,469,559 | B2 | * | 6/2013 | Williams | 362/395 |
| 8,494,337 | B2 | * | 7/2013 | Grotsch | 385/146 |
| 2006/0067640 | A1 | * | 3/2006 | Hsieh et al. | 385/146 |
| 2009/0225440 | A1 | * | 9/2009 | Ho | 359/709 |
| 2010/0027282 | A1 | | 2/2010 | Gebauer et al. | |
| 2010/0091491 | A1 | | 4/2010 | Jiang et al. | |
| 2010/0097809 | A1 | | 4/2010 | Munro et al. | |

(Continued)

FOREIGN PATENT DOCUMENTS

| JP | S61171177 A | 8/1986 |
| TW | 200938880 A | 9/2009 |

OTHER PUBLICATIONS

International Search Report, dated Jun. 26, 2014, from corresponding PCT application.

(Continued)

*Primary Examiner* — Ali Alavi
(74) *Attorney, Agent, or Firm* — Young & Thompson

(57) ABSTRACT

A light guide (201) including a transparent element is presented. The transparent element includes a first end (203) including a place for a light source, a second end (204) opposite the first end, an outer surface (205) between the first and second ends, and an interior channel (206) extending from the first end to the second end. The interior channel includes a first portion (207) beginning from the first end and a second portion (208) extending to the second end. The first portion is shaped to guide at least part of light falling to its wall into the transparent material and the outer surface provides total reflection for reflecting the light towards the second end. The second portion is shaped so that light passed through the first portion without falling to a wall of the first portion reaches the second end without falling to a wall of the second portion.

20 Claims, 10 Drawing Sheets

(56) References Cited

U.S. PATENT DOCUMENTS

2011/0127553 A1 6/2011 Duan et al.
2012/0240976 A1 9/2012 Kuo

OTHER PUBLICATIONS

Finnish Search Report, dated Nov. 22, 2013, from corresponding FI application.

\* cited by examiner

LIGHT GUIDE

FIELD OF THE INVENTION

The invention relates generally to illuminating engineering. More particularly, the invention relates to a light guide for modifying a light distribution pattern of a light source that can be, for example but not necessarily, a light emitting diode "LED".

BACKGROUND

Distribution of light produced by a light source can be important or even critical in some applications. The light source can be, for example but not necessarily, a light emitting diode "LED", a filament lamp, or a gas-discharge lamp. FIG. 1a shows a view of a section taken from an exemplifying light guide 101 according to the prior art for modifying a light distribution pattern of a light source 102. Some of the light beams radiated by the light source 102 are depicted with dashed line arrows in FIG. 1a. The light guide 101 can be rotationally symmetric with respect to a geometric line 120 shown in FIG. 1a. The geometric line 120 is parallel with the z-axis of a coordinate system 199. The light guide 101 is made of transparent material having refractive index greater than unity. The light guide comprises a first end 103 comprising a place for the light source, a second end 104 opposite the first end, and an outer surface 105 between the first and second ends. The outer surface 105 is shaped to provide total reflection for reflecting light towards the second end 104. An inconvenience related to light guides of the kind described above is that also light that is not reflected by the outer surface 105 is attenuated by the transparent material. FIG. 1b shows a view of a section taken from another exemplifying light guide 111 according to the prior art for modifying a light distribution pattern of a light source 112. Some of the light beams radiated by the light source 112 are depicted with dashed line arrows in FIG. 1b. The light guide 111 can be rotationally symmetric with respect to a geometric line 121 shown in FIG. 1b. The light guide 111 is a bowl-like element having a first end 113 comprising a place for the light source 112, a second end 114 opposite the first end, and a reflective layer 115 on the inner surface of the bowl-like element. In this case, light is not attenuated by any transparent material, but an inconvenience related to the light guide illustrated in FIG. 1b is the need for the reflective layer 115 on the inner surface of the bowl-like element.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the invention, there is provided a new light guide for modifying the light distribution pattern of a light source. A light guide according to the invention comprises a transparent element made of transparent material having refractive index greater than unity, the transparent element comprising:
 a first end comprising a place for the light source,
 a second end opposite the first end,
 an outer surface between the first and second ends, and
 an interior channel free from the transparent material and extending from the first end to the second end.

The interior channel comprises a first portion beginning from the first end and a second portion extending to the second end. The first portion is shaped to guide at least part of light falling to a wall of the first portion into the transparent material and towards the outer surface, and the outer surface is shaped to provide total reflection for reflecting the at least part of the light towards the second end. The second portion of the interior channel is at least as long as the first portion, and the second portion is shaped so that:

$$W/L \geq W1/L1, \text{ when } L \geq L1, \qquad (1)$$

where L is a distance from the first end, W is a width of the interior channel at the distance L from the first end, L1 is a length of the first portion, and W1 is a width of the first portion at a distance of L1 from the first end.

As the lower limit of the width of the second portion increases according to the equation (1) when the distance L from the first end increases, i.e. the distance from the light source increases, light that has passed through the first portion without falling to the wall of the first portion reaches the second end without falling to the wall of the second portion. Therefore, the light that has passed through the first portion without falling to the wall of the first portion is not subject to attenuation caused by the transparent material. On the other hand, the total reflection provided by the above-mentioned outer surface can be utilized.

In accordance with the invention, there is provided also a new light guide system comprising a light guide according to the invention and a collimating lens for collimating light coming from the second end of the light guide.

In accordance with the invention, there is provided also a new illuminator device comprising at least one light source and at least one light guide according to the invention. The at least one light source may comprise, for example, one or more light emitting diodes "LED".

A light guide according to an exemplifying and non-limiting embodiment of the invention is a single piece of transparent material that can be manufactured, for example, by mold casting. In accordance with the invention, there is provided also a new mold having a form suitable for manufacturing, by mold casting, the above-mentioned single piece of the transparent material.

A number of exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying embodiments when read in connection with the accompanying drawings.

The verbs "to comprise" and "to include" are used in this document as open limitations that neither exclude nor require the existence of also un-recited features. The features recited in depending claims are mutually freely combinable unless otherwise explicitly stated.

BRIEF DESCRIPTION OF THE FIGURES

The exemplifying and non-limiting embodiments of the invention and their advantages are explained in greater detail below with reference to the accompanying drawings, in which:

FIGS. 1a and 1b have already been explained in the Background-section of this document.

DESCRIPTION OF EXEMPLIFYING EMBODIMENTS

Figure 1A:
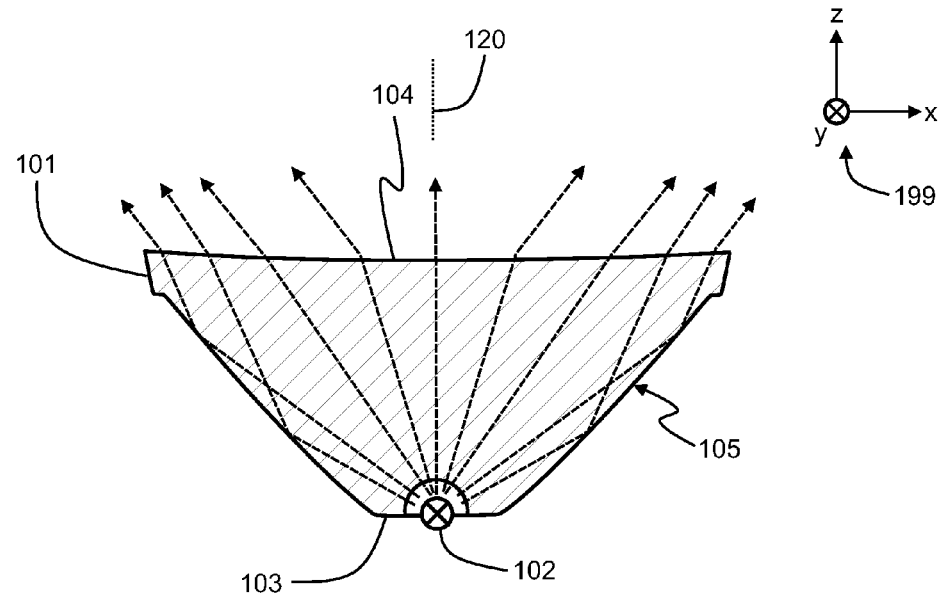
FIGS. 1a and 1b show section views of light guides according to the prior art.
Figure 1B:
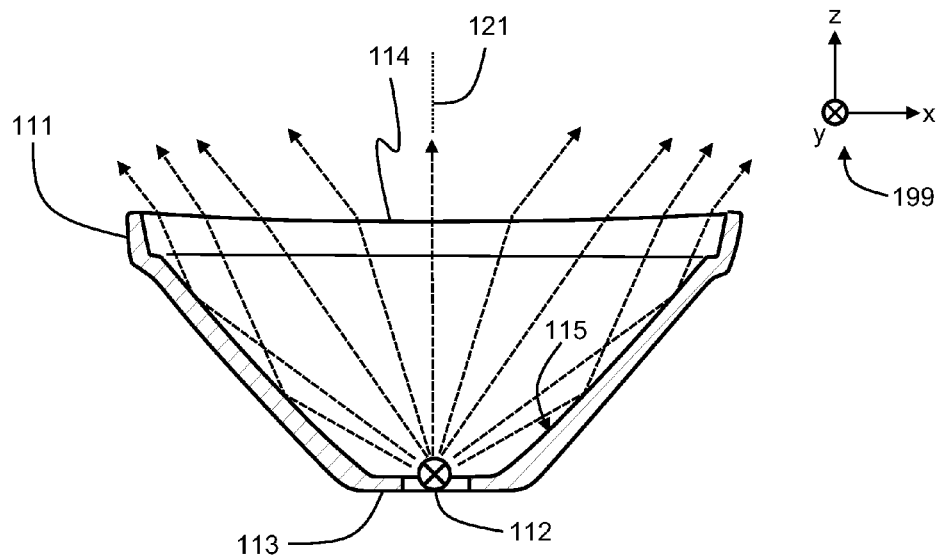
Figure 2:
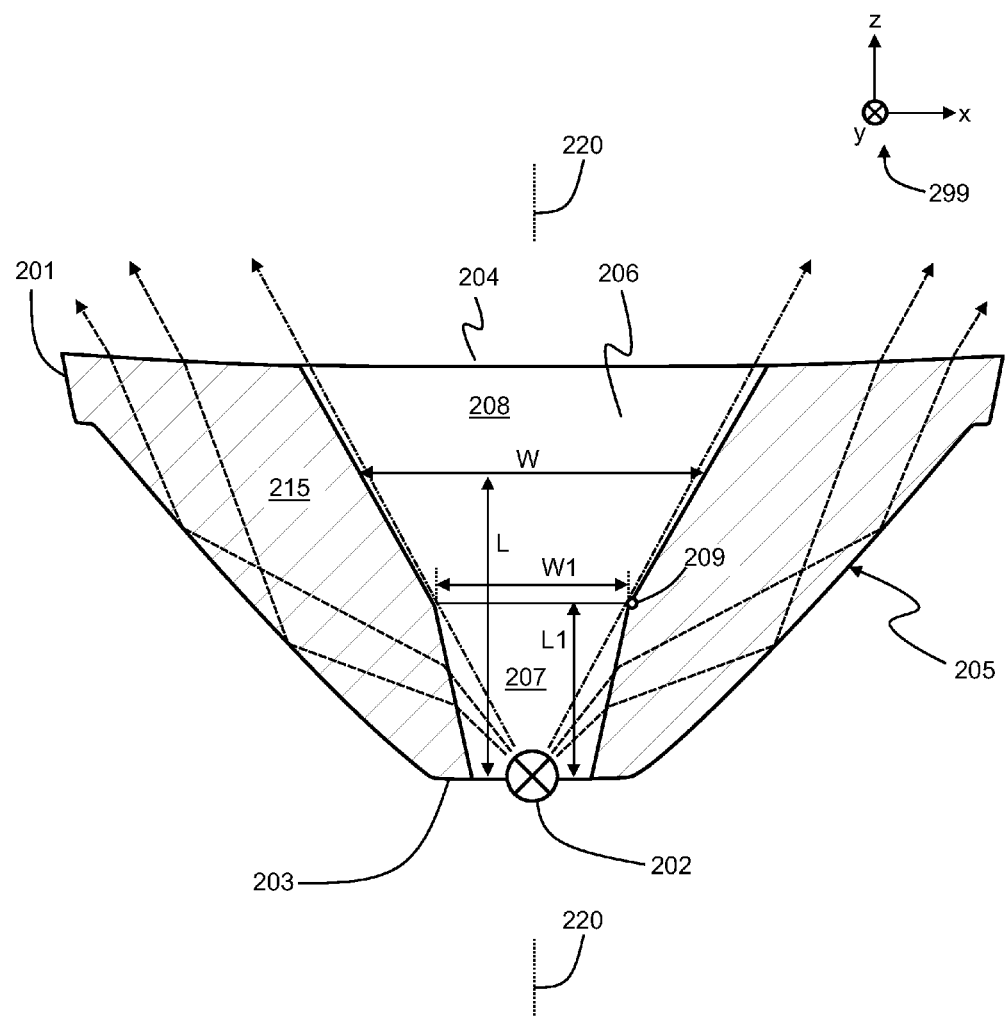
FIG. 2 shows a section view of a light guide according to an exemplifying embodiment of the invention.

FIG. 2 shows a section view of a light guide 201 according to an exemplifying embodiment of the invention for modifying the light distribution pattern of a light source 202 that can be, for example but not necessarily, a light emitting diode "LED", a filament lamp, or a gas-discharge lamp. The section shown in FIG. 2 has been taken along a section plane parallel to xz-plane of a coordinate system 299. The light guide comprises a transparent element 215 made of solid transparent material having the refractive index greater than unity. The transparent material can be, for example, acrylic plastic, polycarbonate, optical silicone, or glass. The method of manufacture of the transparent element 215 can be for example mold casting. The transparent element comprises a first end 203 comprising a place for the light source 202, a second end 204 opposite the first end, an outer surface 205 between the first and second ends, and an interior channel 206 that is free from the transparent material and extends from the first end to the second end as illustrated in FIG. 2. The interior channel 206 comprises a first portion 207 beginning from the first end 203 and a second portion 208 extending to the second end 204. The first portion is shaped to guide at least part of light falling to a wall of the first portion into the transparent material and towards the outer surface 205. Therefore, the wall of the first portion 207 of the interior channel operates as a light collector. The outer surface 205 is shaped to provide total reflection for reflecting the at least part of the light towards the second end 204. In FIG. 2, some of the light beams falling to the wall of the first portion 207 of the interior channel and reflected by the outer surface 205 are depicted with dashed line arrows.

The second portion 208 of the interior channel 206 is at least as long as the first portion 207, and the second portion is shaped so that:

$W/L \geq W1/L1$, when $L \geq L1$, where L is a distance from the first end, W is the width of the interior channel at the distance L from the first end, L1 is the length of the first portion, and W1 is the width of the first portion at the distance of L1 from the first end. The length L1 of the first portion 207 can be defined with the aid of a straight line that begins from the light source 202 and touches the wall of the interior channel without penetrating the wall of the interior channel. A point of contact 209 between the straight line and the wall of the interior channel determines the length L1 of the first portion 207 as illustrated in FIG. 2. As can be seen from FIG. 2, the light that has passed through the first portion 207 without falling to the wall of the first portion reaches the second end 204 without falling to the wall of the second portion 208. In FIG. 2, some of the light beams passing through the first portion 207 without falling to the wall of the first portion are depicted with dot-and-dash line arrows. The interior channel 206 is advantageously symmetric with respect to a geometric line 220 that is parallel with the distance between the first and second ends.

Figure 3A:
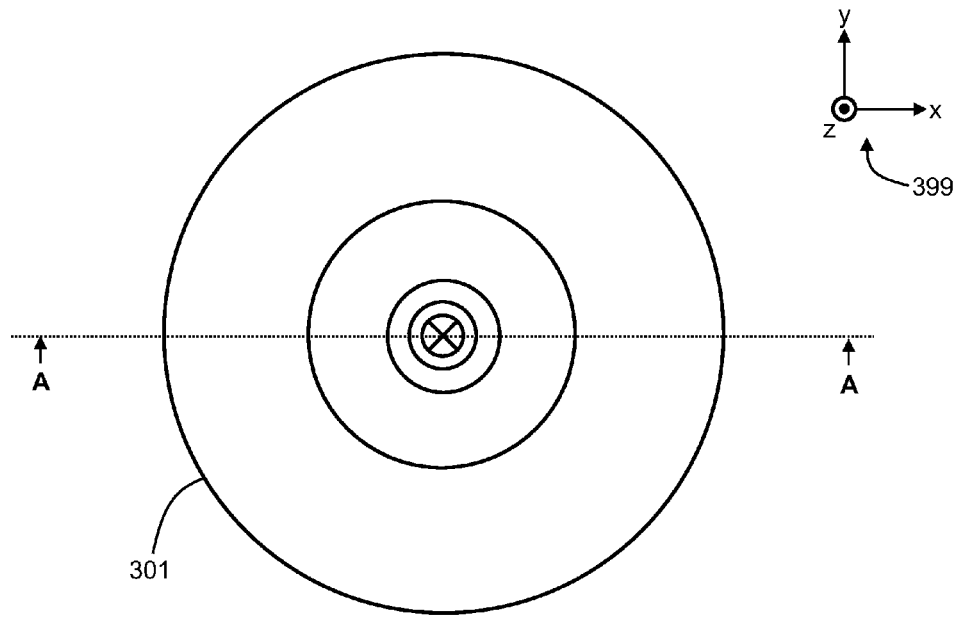
FIGS. 3a and 3b illustrate a light guide according to an exemplifying embodiment of the invention.
Figure 3B:
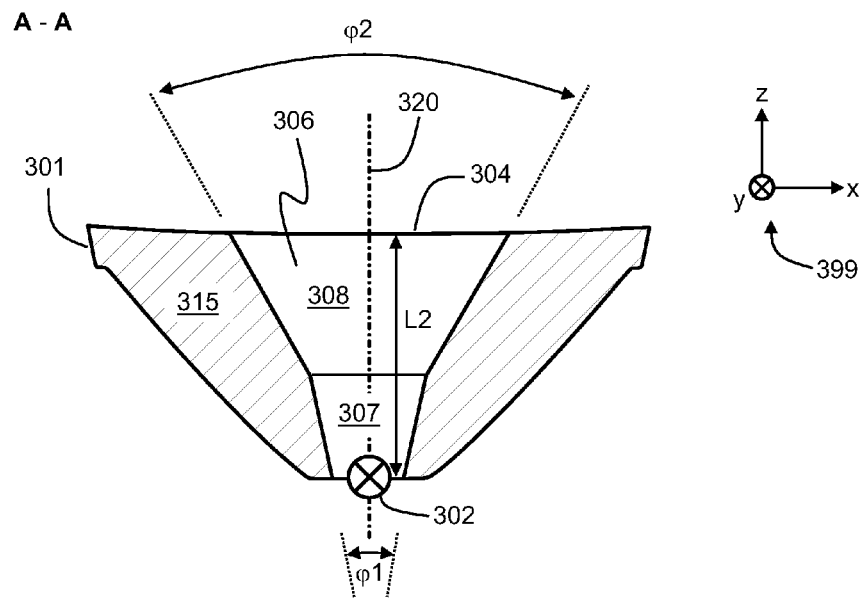

FIGS. 3a and 3b illustrate a light guide 301 according to an exemplifying embodiment of the invention. FIG. 3b shows a view of a section taken along the line A-A shown in FIG. 3a. In this exemplifying case, the transparent element 315 of the light guide 301 is substantially rotationally symmetric with respect to a geometric center line 320 of the interior channel, where the geometric center line is parallel with the distance L2 between the first and second ends of the transparent element 315. In FIG. 3, the geometric center line is parallel with the z-axis of a coordinate system 399.

In the exemplifying light guide illustrated in FIGS. 3a and 3b, the wall of the second portion 308 of the interior channel 306 defines a truncated cone opening towards the second end 304. The wall of the first portion 307 of the interior channel defines another truncated cone opening towards the second end and having a coning angle $\phi 1$ smaller than the coning angle $\phi 2$ of the truncated cone defined by the wall of the second portion 308.

An illumination device according to an exemplifying embodiment of the invention comprises the light guide 301 and a light source 302. The light source 302 is substantially a point-form light source that can be, for example, a light emitting diode "LED".

Figure 3C:
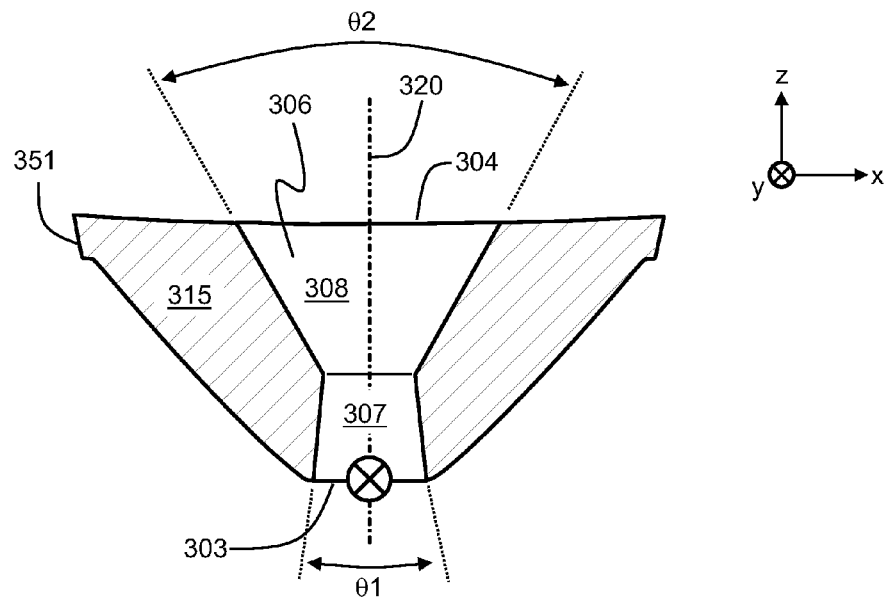
FIGS. 3c and 3d show section views of light guides according to exemplifying embodiments of the invention.

FIG. 3c shows a section view of a light guide according to an exemplifying embodiment of the invention. The transparent element 315 of the light guide is substantially rotationally symmetric with respect to a geometric center line 320 of the interior channel 306. The wall of the second portion 308 of the interior channel 306 defines a truncated cone opening towards the second end 304 and having a coning angle $\theta 2$. The wall of the first portion 307 of the interior channel defines another truncated cone opening towards the first end 303 and having a coning angle $\theta 1$.

Figure 3D:
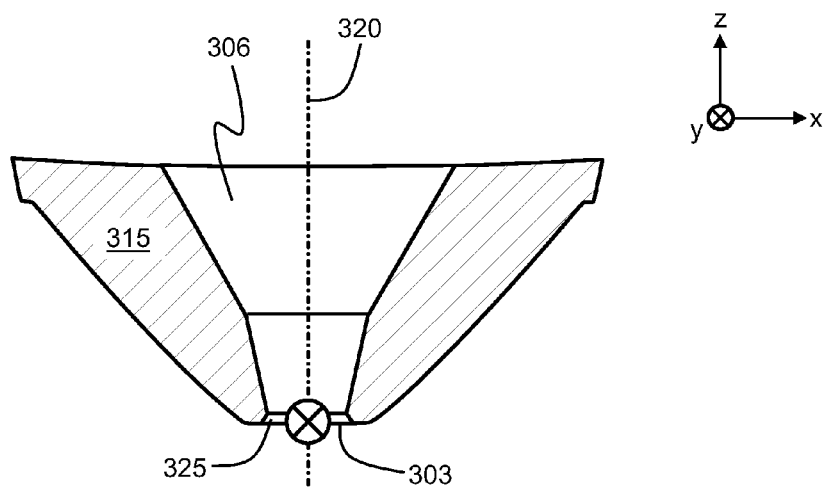

FIG. 3d shows a section view of a light guide according to an exemplifying embodiment of the invention. The transparent element 315 of the light guide is substantially rotationally symmetric with respect to a geometric center line 320 of the interior channel 306. In this exemplifying case, the interior channel 306 has a beveling 325 at its first end 303 as illustrated in FIG. 3d.

Figure 4A:
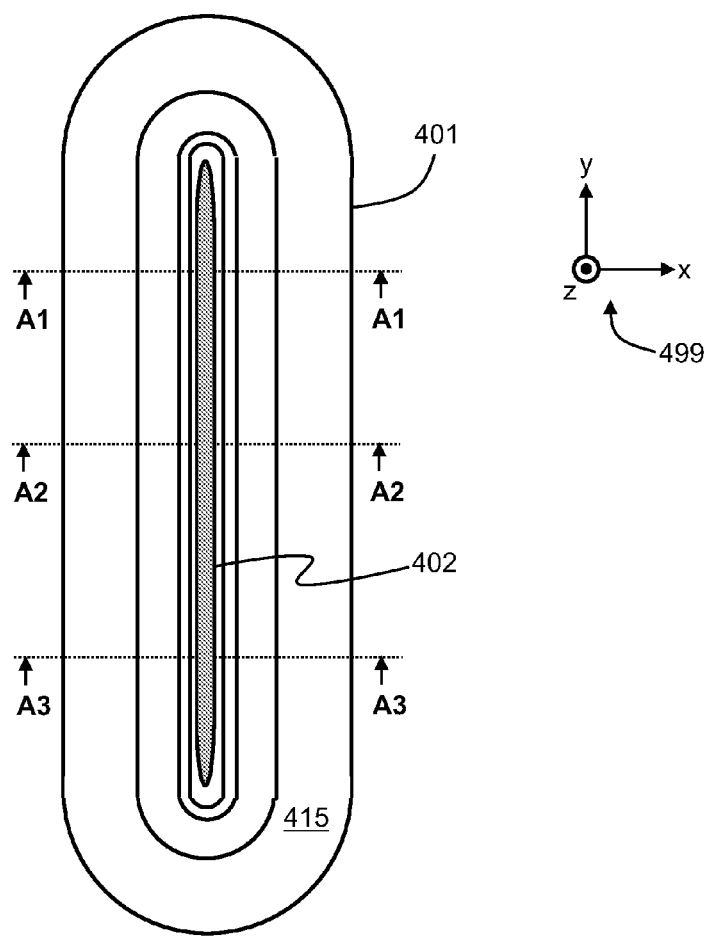
FIGS. 4a and 4b illustrate a light guide according to an exemplifying embodiment of the invention.
Figure 4B:
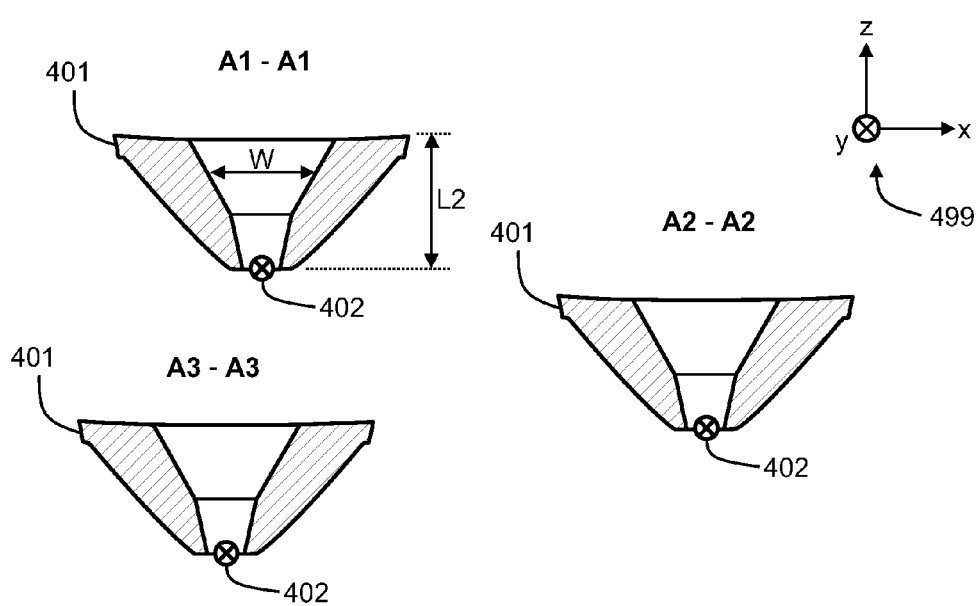

FIGS. 4a and 4b illustrate a light guide 401 according to an exemplifying embodiment of the invention for modifying the light distribution pattern of a light source 402. FIG. 4b shows a view of a section taken along the line A1-A1 shown in FIG. 4a, a view of a section taken along the line A2-A2 shown in FIG. 4a, and a view of a section taken along the line A3-A3 shown in FIG. 4a. In this exemplifying case, the transparent element 415 of the light guide 401 has a form having a substantially constant cross-section taken along a geometric section plane moving a predetermined displacement in a direction that is perpendicular to the geometric section plane, perpendicular to a distance L2 between the first and second ends, and perpendicular to the width W of the interior channel. The above-described geometrical property is manifested by the fact that the section views shown in FIG. 4b are similar to each other. The above-mentioned geometric section plane is parallel with the xz-plane of a coordinate system 499 and it moves in a direction parallel with the y-axis of the coordinate system 499.

An illumination device according to an exemplifying embodiment of the invention comprises the light guide 401 and the light source 402. The light source 402 is substantially a line-form light source that can be, for example, a fluorescence tube or a plurality of light emitting diodes "LED" in line.

Figure 5:
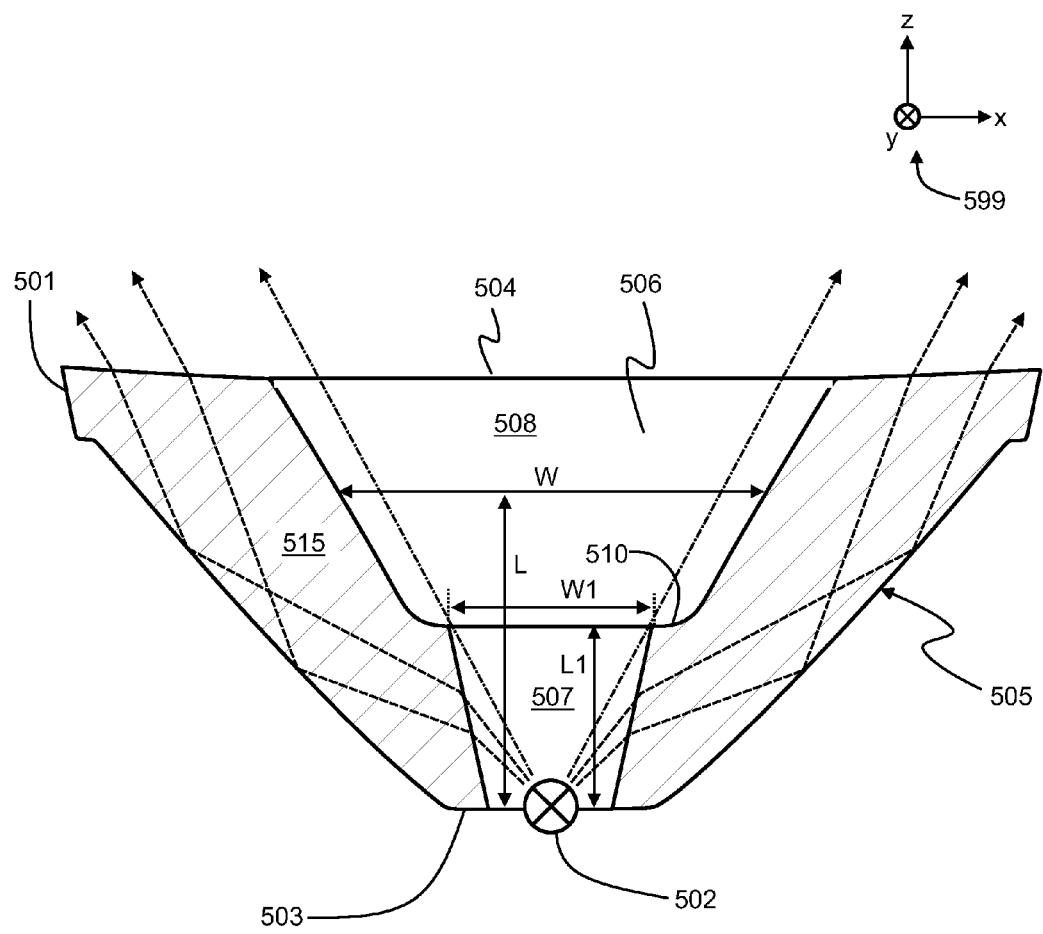
FIG. 5 shows a section view of a light guide according to an exemplifying embodiment of the invention.

FIG. 5 shows a section view of a light guide 501 according to an exemplifying embodiment of the invention for modifying the light distribution pattern of a light source 502. The light guide comprises a transparent element 515 made of solid transparent material having the refractive index greater than unity. The transparent element comprises a first end 503 comprising a place for the light source 502, a second end 504 opposite the first end, an outer surface 505 between the first and second ends, and an interior channel 506 that is free from the transparent material and extends from the first end to the second end as illustrated in FIG. 5. The interior channel 506 comprises a first portion 507 beginning from the first end and a second portion 508 extending to the second end. The first portion is shaped to guide at least part of light falling to a wall of the first portion into the transparent material and towards the outer surface 505. The outer surface is shaped to provide total reflection for reflecting the at least part of the light towards the second end 504. In FIG. 5, some of the light beams falling to the wall of the first portion 507 of the interior channel and reflected by the outer surface 505 are depicted with dashed line arrows. The second portion 508 of the interior channel 506 is at least as long as the first portion 507, and the second portion is shaped so that W/L>W1/L1 when L>L1, where L is the distance from the first end, W is the width of the interior channel at the distance L from the first end, L1 is the length of the first portion, and W1 is the width of the first portion at the distance of L1 from the first end. In the exemplifying case illustrated in FIG. 5, the interior channel comprises a step-wise widening 510 in the transitional region from the first portion 507 to the second portion 508. The exemplifying case illustrated in FIG. 5, shows that the rule W/L≤W1/L1 gives only a lower limit for the width W of the interior channel 506 at the distance L from the first end 503. In FIG. 5, some of the light beams passing through the first portion 507 without falling to the wall of the first portion are depicted with dot-and-dash line arrows.

Figure 6A:
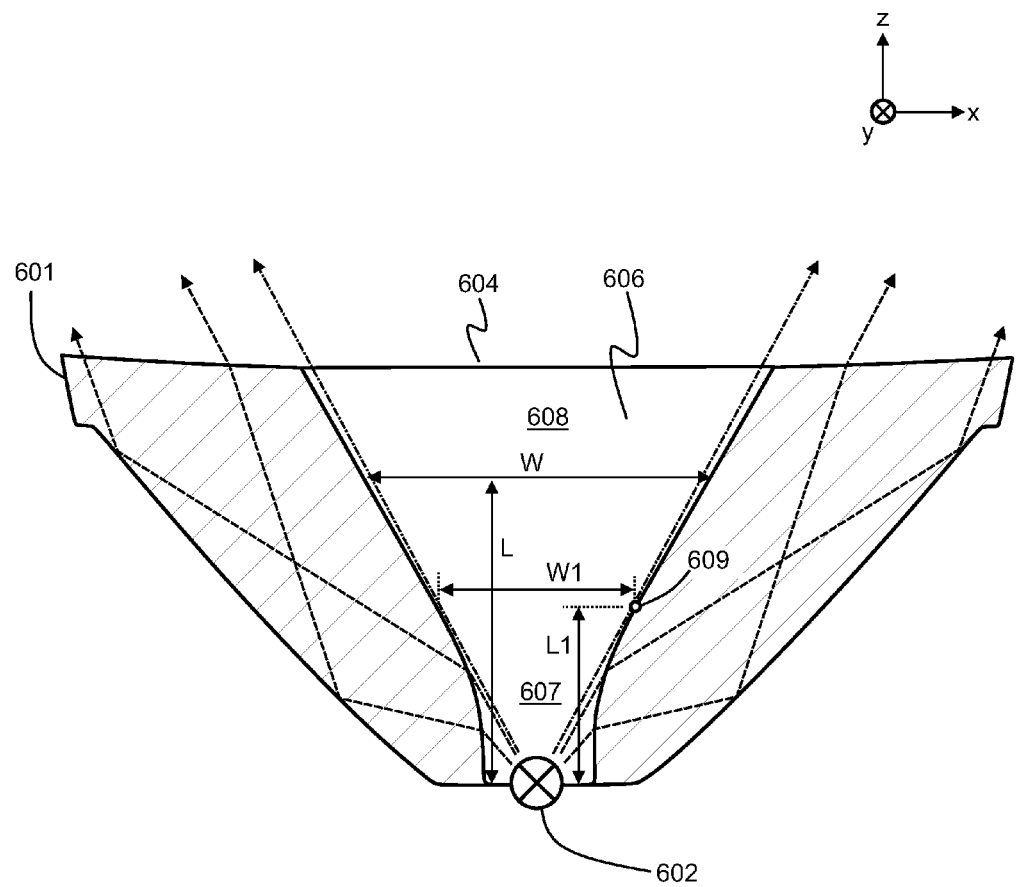
FIG. 6a shows a section view of a light guide according to an exemplifying embodiment of the invention.

FIG. 6a shows a section view of a light guide 601 according to an exemplifying embodiment of the invention for modifying the light distribution pattern of a light source 602. In this exemplifying case, the interior channel 606 is shaped to be smooth so that there is no clearly visible turning point in the profile of the interior channel 606 on the transitional region from the first portion 607 to the second portion 608. Also in this case, the length L1 of the first portion 607 can be defined with the aid of a straight line that begins from the light source 602 and touches the wall of the interior channel 606 without penetrating the wall of the interior channel. A point of contact 609 between the straight line and the wall of the interior channel determines the length L1 of the first portion 607 as illustrated in FIG. 6a. As can be seen from FIG. 6a, the light that has passed through the first portion 607 without falling to the wall of the first portion reaches the second end 604 without falling to the wall of the second portion 608.

Figure 6B:
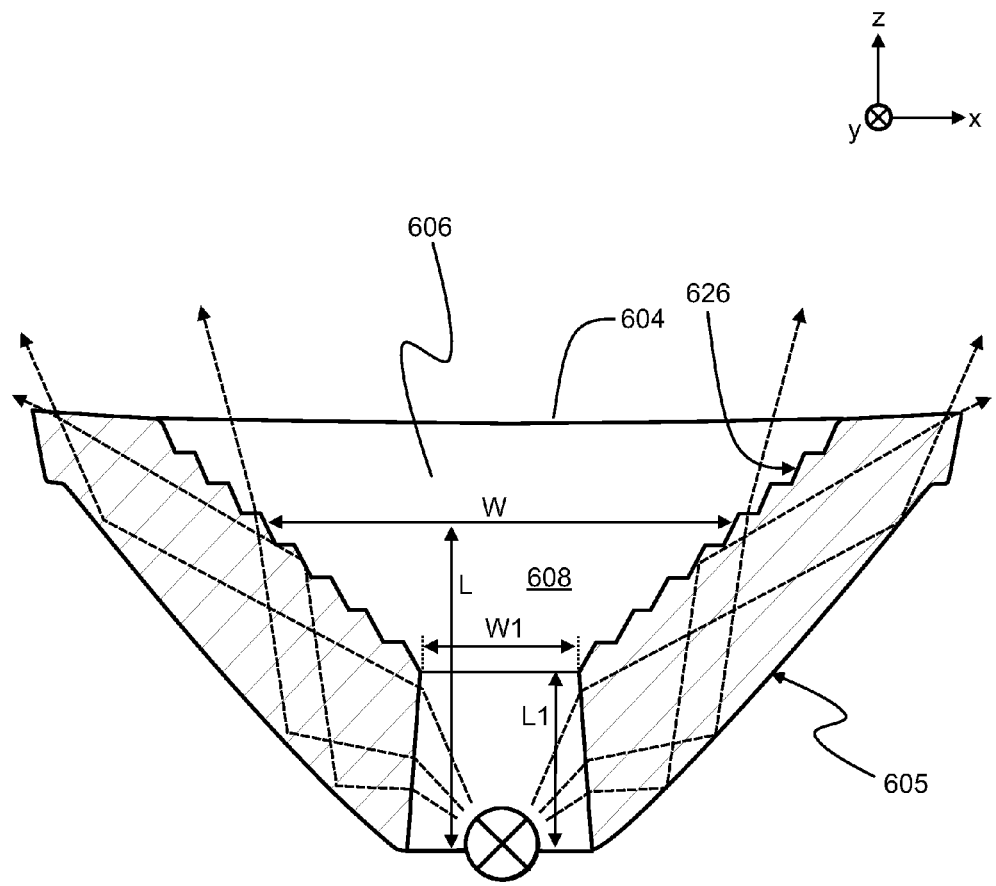
FIG. 6b shows a section view of a light guide according to an exemplifying embodiment of the invention.

FIG. 6b shows a section view of a light guide according to an exemplifying embodiment of the invention for modifying the light distribution pattern of a light source. In this exemplifying case, the wall 626 of the second portion 608 of the interior channel 606 is staggered so that part of light reflected from the first surface 605 penetrates the wall 626 and another part of this light is reflected from the wall 626 towards the second end 604 of the interior channel 606. Some of the light beams reflected from the surface 605 are depicted with dashed line arrows in FIG. 6b. It is also possible that the wall 626 of the second portion 608 is shaped so that it reflects most of the light falling to it, or so that most of the light penetrates the wall 626 and the wall acts as a refracting surface.

Figure 7:
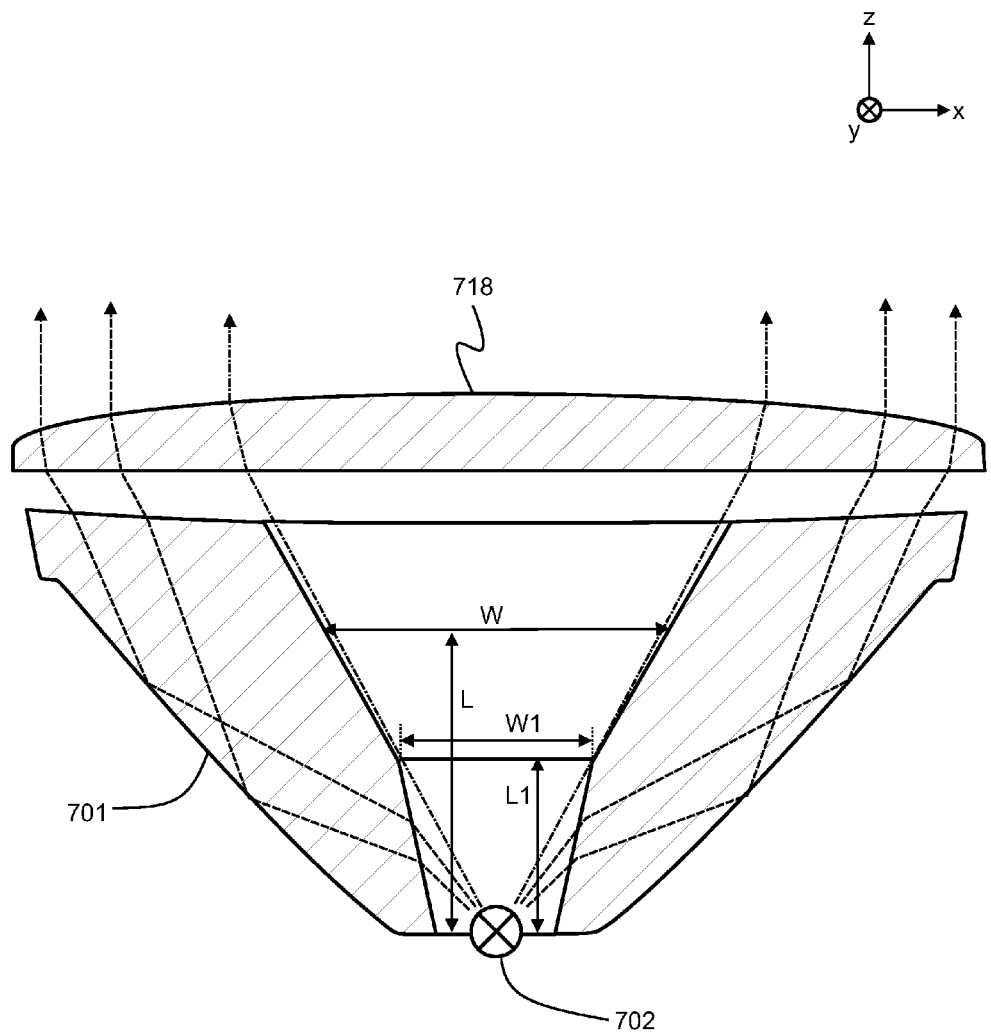
FIG. 7 shows a section view of a light guide system according to an exemplifying embodiment of the invention.

FIG. 7 shows a section view of a light guide system according to an exemplifying embodiment of the invention for modifying the light distribution pattern of a light source 702. The light guide system comprises a light guide 701 according to an exemplifying embodiment of the invention and a collimating lens 718 for collimating the light coming from the light guide 701.

Figure 8A:
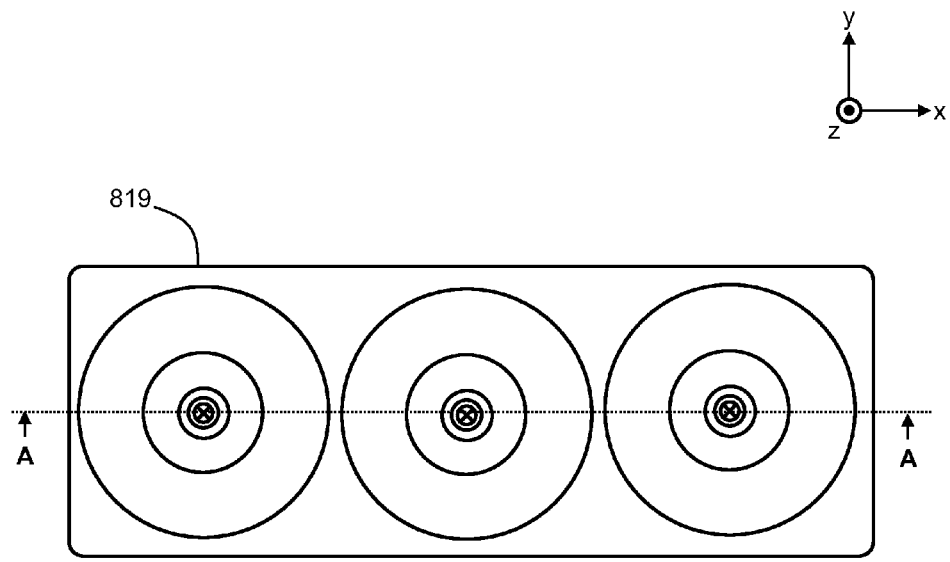
FIGS. 8a and 8b illustrate an illuminator device according to an exemplifying embodiment of the invention.
Figure 8B:
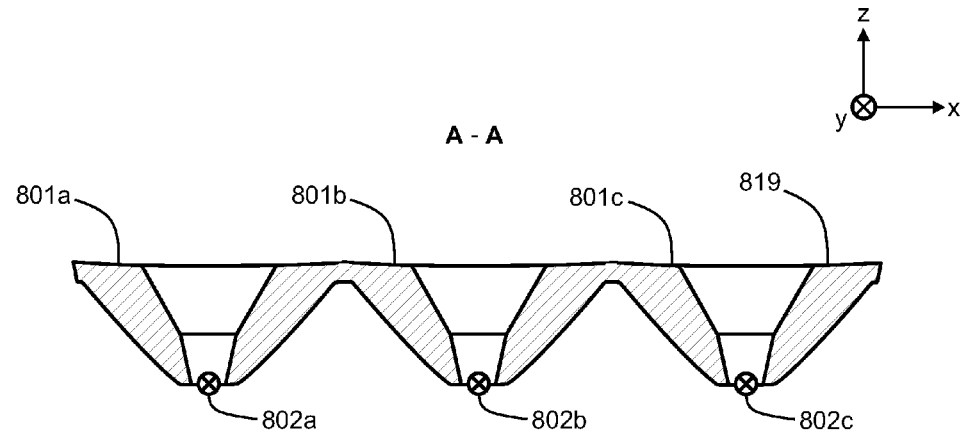

FIGS. 8a and 8b illustrate an illuminator device according to an exemplifying embodiment of the invention. FIG. 8b shows a view of a section taken along the line A-A shown in FIG. 8a. The illuminator device comprises light sources 802a, 802b and 802c, and light guides 801a, 801b and 801c. Each of the light guides is according to an embodiment of the invention. Each of the light sources 802a-802c may comprise at least one light emitting diode "LED". In the exemplifying case illustrated in FIGS. 8a and 8b, the light guides 801a-801c are parts of a single piece 819 of transparent material.

The specific examples provided in the description given above should not be construed as limiting the scope and/or the applicability of the appended claims. In the above-presented examples, the light guide comprises only transparent material. However, in some cases, the light guide may comprise also parts made of non-transparent material such as, for example, parts for providing mechanical support to the light source.

What is claimed is:

1. A light guide for modifying a light distribution pattern of a light source, the light guide comprising a transparent element made of transparent material having refractive index greater than unity and the transparent element comprising:
    a first end comprising a place for the light source,
    a second end opposite the first end,
    an outer surface between the first and second ends, and
    an interior channel free from the transparent material and extending from the first end to the second end,
    wherein the interior channel comprises a first portion beginning from the first end and a second portion extending to the second end, the first portion being shaped to guide at least part of light falling to a wall of the first portion into the transparent material and towards the outer surface, and the outer surface being shaped to provide total reflection for reflecting the at least part of the light towards the second end, and wherein the second portion is at least as long as the first portion, and the second portion is shaped so that:

$W/L \geq W1/L1$, when $L \geq L1$, where L is a distance from the first end, W is a width of the interior channel at the distance L from the first end, L1 is a length of the first portion, and W1 is a width of the first portion at a distance of L1 from the first end, and
    wherein the wall of the first portion of the interior channel defines a truncated cone.

2. A light guide according to claim 1, wherein the transparent element of the light guide is substantially rotationally symmetric with respect to a geometric center line of the interior channel, the geometric center line being parallel with a distance between the first and second ends.

3. A light guide according to claim 1, wherein the transparent element of the light guide has a form having a substantially constant cross-section taken along a geometric section plane moving a predetermined displacement in a direction that is perpendicular to the geometric section plane, perpendicular to a distance between the first and second ends, and perpendicular to the width of the interior channel.

4. A light guide according to claim 2, wherein a wall of the second portion of the interior channel defines another truncated cone opening towards the second end.

5. A light guide according to claim 4, wherein the truncated cone defined by the wall of the first portion of the interior channel opens toward the second end and has a coning angle smaller than that of the another truncated cone defined by the wall of the second portion of the interior channel.

6. A light guide according to claim 4, wherein the truncated cone defined by the wall of the first portion of the interior channel opens toward the first end.

7. A light guide according to claim 1, wherein the interior channel comprises a step-wise widening in a transitional region from the first portion of the interior channel to the second portion of the interior channel.

8. A light guide according to claim 2, wherein the interior channel comprises a step-wise widening in a transitional region from the first portion of the interior channel to the second portion of the interior channel.

9. A light guide according to claim 4, wherein the interior channel comprises a step-wise widening in a transitional region from the first portion of the interior channel to the second portion of the interior channel.

10. A light guide according to claim 1, wherein the transparent material of the light guide is one of the following: acrylic plastic, polycarbonate, optical silicone.

11. A light guide according to claim 2, wherein the transparent material of the light guide is one of the following: acrylic plastic, polycarbonate, optical silicone.

12. A light guide according to claim 4, wherein the transparent material of the light guide is one of the following: acrylic plastic, polycarbonate, optical silicone.

13. A light guide system comprising a light guide and a collimating lens for collimating light coming from the light guide, the light guide comprising a transparent element made of transparent material having refractive index greater than unity and the transparent element comprising:
a first end comprising a place for a light source,
a second end opposite the first end,
an outer surface between the first and second ends, and
an interior channel free from the transparent material and extending from the first end to the second end,
wherein the interior channel comprises a first portion beginning from the first end and a second portion extending to the second end, the first portion being shaped to guide at least part of light falling to a wall of the first portion into the transparent material and towards the outer surface, and the outer surface being shaped to provide total reflection for reflecting the at least part of the light towards the second end, and wherein the second portion is at least as long as the first portion, and the second portion is shaped so that:

$W/L \geq W1/L1$, when $L \geq L1$, where L is a distance from the first end, W is a width of the interior channel at the distance L from the first end, L1 is a length of the first portion, and W1 is a width of the first portion at a distance of L1 from the first end, and
wherein the wall of the first portion of the interior channel defines a truncated cone.

14. An illuminator device comprising at least one light guide and at least one light source, each light guide comprising a transparent element made of transparent material having refractive index greater than unity and the transparent element comprising:
a first end comprising a place for the light source,
a second end opposite the first end,
an outer surface between the first and second ends, and
an interior channel free from the transparent material and extending from the first end to the second end,
wherein the interior channel comprises a first portion beginning from the first end and a second portion extending to the second end, the first portion being shaped to guide at least part of light falling to a wall of the first portion into the transparent material and towards the outer surface, and the outer surface being shaped to provide total reflection for reflecting the at least part of the light towards the second end, and wherein the second portion is at least as long as the first portion, and the second portion is shaped so that:

$W/L \geq W1/L1$, when $L \geq L1$, where L is a distance from the first end, W is a width of the interior channel at the distance L from the first end, L1 is a length of the first portion, and W1 is a width of the first portion at a distance of L1 from the first end, and
wherein the wall of the first portion of the interior channel defines a truncated cone.

15. An illuminator device according to claim 14, wherein the light source is substantially a point-form light source and the transparent element of the light guide is substantially rotationally symmetric with respect to a geometric center line of the interior channel, the geometric center line being parallel with a distance between the first and second ends.

16. An illuminator device according to claim 14, wherein the light source is substantially a line-form light source and the transparent element of the light guide has a form having a substantially constant cross-section taken along a geometric section plane moving a predetermined displacement in a direction that is perpendicular to the geometric section plane, perpendicular to a distance between the first and second ends, and perpendicular to the width of the interior channel.

17. An illuminator device according to claim 14, wherein the illuminator device further comprises a collimating lens for collimating light coming from the light guide.

18. An illuminator device according to claim 15, wherein the illuminator device further comprises a collimating lens for collimating light coming from the light guide.

19. A mold having a form suitable for manufacturing, by mold casting, a transparent element of a light guide, wherein the transparent element comprises:
a first end comprising a place for a light source,
a second end opposite the first end,
an outer surface between the first and second ends, and
an interior channel free from the transparent material and extending from the first end to the second end,
wherein the interior channel comprises a first portion beginning from the first end and a second portion extending to the second end, the first portion being shaped to guide at least part of light falling to a wall of the first portion into the transparent material and towards the outer surface, and the outer surface being shaped to provide total reflection for reflecting the at least part of the light towards the second end, and wherein the second portion is at least as long as the first portion, and the second portion is shaped so that:

$W/L \geq W1/L1$, when $L \geq L1$, where L is a distance from the first end, W is a width of the interior channel at the distance L from the first end, L1 is a length of the first portion, and W1 is a width of the first portion at a distance of L1 from the first end, and wherein the wall of the first portion of the interior channel defines a truncated cone.

20. A mold according to claim 19 and having a form suitable for manufacturing, by mold casting, a transparent element of a light guide, wherein the transparent element the transparent element of the light guide is substantially rotationally symmetric with respect to a geometric center line of the interior channel, the geometric center line being parallel with a distance between the first and second ends.

* * * * *